United States Patent [19]

Vecht

[11] 3,714,339
[45] Jan. 30, 1973

[54] METHOD OF PREPARING METALLIC SELENIDES

[75] Inventor: Aron Vecht, London, England

[73] Assignee: BDH Chemicals Limited, London, England

[22] Filed: Nov. 3, 1970

[21] Appl. No.: 86,627

[30] Foreign Application Priority Data

Nov. 10, 1969 Great Britain.....................54,879/69

[52] U.S. Cl.................................................423/509
[51] Int. Cl............................C01g 9/00, C01g 11/00
[58] Field of Search ..........23/204 R, 134, 135, 50 R; 260/551 R

[56] References Cited

UNITED STATES PATENTS

| | | | |
|---|---|---|---|
| 3,432,262 | 3/1969 | Rovich | 23/134 |
| 2,805,917 | 9/1957 | Nitsche | 23/134 |
| 3,178,312 | 4/1965 | Johnson | 23/204 |
| 2,789,033 | 4/1957 | Pruett | 23/134 |
| 3,033,659 | 5/1962 | Fischer | 23/134 |

*Primary Examiner*—Oscar R. Vertiz
*Assistant Examiner*—Hoke S. Miller
*Attorney*—Bacon & Thomas

[57] ABSTRACT

A process for the preparation of metallic selenides is provided which comprises homogeneous precipitation of a selenide from a solution of a compound of the metal and a compound of selenium. Zinc and cadmium selenides are particularly produced. The products are of high purity and have extremely homogeneous properties.

8 Claims, No Drawings

METHOD OF PREPARING METALLIC SELENIDES

This invention relates to a process for the preparation of metallic selenides in particular zinc selenide and cadmium selenide. These compounds have application as host materials in phosphors and as photoconductive and photovoltaic materials.

Phosphor materials comprise an appropriate host compound together with activator impurities and in order to ensure that only the correct impurities are present it is necessary to provide a host material having a high degree of purity.

It is an object of the present invention to provide a method of preparing metallic selenides having a high degree of purity.

According to the present invention there is provided a process for the preparation of metallic selenides which comprises homogeneous precipitation of a selenide from a solution of a compound of the metal and a compound of selenium.

Homogeneous precipitation is a process of precipitation in which the precipitant is not added as such to the solution from which the precipitate is required but is formed in situ throughout the solution by a homogeneous chemical reaction which is initiated by a change in the conditions, for example by heating. By this means a precipitate is formed which has extremely homogeneous properties.

The precipitation is preferably effected in non-aqueous solution so that the product is not contaminated with water. However, it may be carried out using an aqueous solution as even in this case the purity of the product is outstanding. The reaction can also be carried in a non-aqueous solution and with reagents, for example thiocyanates, which do not contain oxygen as is more fully described below. In this way a product of maximum purity is obtained. A product obtained from an aqueous solution is referred to as having "aqueous" purity, one obtained from a non-aqueous solution as having "non-aqueous" purity and one obtained from a non-aqueous solution using reactants free of oxygen as having "oxygen-free" purity.

By the process of the invention the selenides are obtained in a very high purity from the particular system.

The selenides may be obtained in the form apparently of a complex with the solvent medium in which the precipitation is carried out but can be liberated from this complex by heating. An example of such a complex is where a non-aqueous solvent such as dimethylformamide (DMF) is used which appears to form a complex with the selenide.

In carrying out the homogeneous precipitation a metal salt is dissolved in the same solvent as the selenium compound which on change of conditions yields selenide ions which result in precipitation of the selenide. In a preferred embodiment the metallic salt is a cadmium or zinc salt of an organic acid for example an acetate. This is dissolved in an organic solvent such as dimethylformamide and to this is added a solution of selenium compound decomposable on heating. Such a selenium compound is selenourea or a substituted or a derivative of said urea or substituted urea in which the two nitrogen atoms of the urea form part of a ring system which may contain further heteroatoms. On raising the temperature of the system homogeneous precipitation of the selenide commences and the product is recoverable in high purity although it may be desirable to remove dimethylformamide from the complex by heating.

When an aqueous system is used the metal salt may be complexed ammonium hydroxide such as zinc or cadmium ammonium hydroxide.

The homogeneous precipitation may also involve the precipitation of a sulphide as well as a selenide. Thus one can use a mixture of selenourea and thiourea to obtain a coprecipitate of the selenide and the sulphide.

The selenides according to the invention may be used as the raw material for a wide variety of uses. Thus, after further treatment they may be host materials in phosphors, which may be cathodoluminescent such phosphor being for example ZnSeCu which may contain ZnS or may be electroluminescent, such phosphor being for example ZnSeMnCu. They may also be used for photovoltaic and photoconductive purposes or may be used as solid solutions with the appropriate sulphide for example ZnSeZnS which may be formed by coprecipitation as mentioned above. They may also be used for the production of single crystals of outstanding purity which can be formed for example, by controlled sublimation.

In order that the invention may be more fully understood the following examples are given by way of illustration only:

EXAMPLE 1

A solution containing equimolar quantities of selenourea and zinc acetate with the maximum concentration being 0.5M with respect to both reagents was prepared by dissolving an appropriate quantity of pure zinc acetate dihydrate in dimethyl formamide (DMF) and the solution was then boiled for a period of 1 hour under an atmosphere of nitrogen to render it free of water. The solution was allowed to cool to 40°–30°C, and stored under nitrogen. With vigorous stirring, and with nitrogen passing through the solution, the required quantity of selenourea was added to the zinc acetate solution, in which it dissolved rapidly, yielding a clear colourless solution. The solution was heated and exhibited a yellow coloration in the temperature range of 50°–110°C, particularly 80°–100°C which was followed by the appearance of a pale-yellow precipitate. The heating was continued for a further 30 minutes, by which time precipitation was complete. The precipitate was isolated by rapid filtration of the hot solution, and the precipitate was washed with DMF, and finally with acetone. The product was dried in vacuo at room temperature for a period of 24 hours. The dried product has a pale-yellow coloration. Using a silica container, the material was placed in a tube-furnace (or vacuum oven), and under an atmosphere of nitrogen (flow rate 0.5 litres/minute), the temperature was raised to 400°C over a period of 4 hours, and maintained at that temperature for a further period of one hour. The color of the material does not change substantially during this operation, although a slight darkening was observed. The product is pure "non-aqueous" zinc selenide. The zinc selenide produced by this method is characterized by its unusual stability to the action of air and light, which normally tend to decompose zinc selenide with a resultant darkening in color.

While in the above-described example zinc selenide was prepared it will be appreciated that cadmium selenide could equally well be prepared by commencing with an appropriate quantity of cadmium acetate or other compound. Alternatively, a mixture of cadmium selenide and zinc selenide can be prepared by starting with an appropriate mixture of zinc acetate and cadmium acetate.

If desired, a mixture of a metallic selenide and a metallic sulphide can be prepared by the above-described process by replacing an appropriate proportion of selenourea by thiourea.

EXAMPLE 2

To a 0.1 molar solution of cadmium acetate dihydrate DMF was added a 10 percent excess over the equimolar quantity of selenourea. The solution was then heated to 50°C and a precipitate was formed. The temperature was then raised to 120°C over a period of one hour to complete the reaction. The precipitate was then filtered, washed twice with previously dried DMF and dried in a vacuum oven at 50°C for 2 hours.

The precipitate was then placed in a furnace in a nitrogen atmosphere and heated for a further one hour at 300°C. The temperature was then raised to 750°C and the furnace was kept at this temperature for a further hour. Upon cooling in nitrogen the pure "non-aqueous" CdSe was obtained.

EXAMPLE 3

Materials used:
Zinc acetate hydrated, AnalaR          110 g
Dimethyl formamide (DMF)               500 ml
Selenourea                             61.5 g
Acetone The DMF was stirred and heated at 95° for one hour. The hydrated zinc acetate was added, nitrogen was bubbled through the mixture and stirring and heating at 95°C continued for 2 hours. The resulting solution was cooled to 40°C under nitrogen and the selenourea added. This dissolved to give a clear, very pale yellow solution. Stirring and nitrogen bubbling were continued and the temperature again raised to 95°C. A precipitate formed and heating was continued for one-half hour. The precipitate was filtered off, washed separately with DMF and acetone and dried in vacuum at 20°–30°C.
Yield 54 g of zinc selenide/DMF compound.

This zinc selenide/DMF compound was decomposed by heating at 175°C in vacuum (0.4 mm Hg) for 24 hours.

Alternatively decomposition of the DMF compound can be achieved by heating at atmospheric pressure in an inert atmosphere at any temperature above 150°C. The resultant product has a good assay as Zn Se but may be slightly discoloured by carbon.

The ZnSe is pure "non-aqueous" zinc selenide.

EXAMPLE 4

This example describes homogeneous precipitation from aqueous solution.

Zinc metal, high purity                70 g
Selenourea                             140 g
Nitric acid, AnalaR
Ammonia solution, AnalaR The zinc was dissolved in just sufficient nitric acid and zinc hydroxide precipitated by the addition of ammonia. The hydroxide was filtered off, washed free of nitrate and redissolved in ammonia solution. The selenourea, dissolved in a minimum of cold water was added and the mixture heated with stirring to 75°C. Precipitation of zinc selenide commenced at this point. After 4–5 hours heating and stirring the precipitated zinc selenide was filtered off, washed and dried in vacuum at 100°C.
Yield 123 g.
To remove last traces of water the product was heated in argon at 800°C for 3 hours.
Yield 100 g pure "aqueous" zinc selenide.

EXAMPLE 5

This example describes homogeneous precipitation of cadmium selenide from aqueous solutions.

Cadmium metal, high purity             40 g
Selenourea                             50 g
Nitric acid AnalaR
Ammonia solution AnalaR The cadmium was dissolved in just sufficient nitric acid and cadmium hydroxide was precipitated by adding diluted ammonia solution. The cadmium hydroxide was washed free of nitrate and redissolved in ammonia solution.

The selenourea was dissolved in a minimum of cold water and added to the reaction mixture which was then stirred and heated to boiling. Heating was continued until no more cadmium selenide precipitated. The product was filtered off, washed with water and dried at 100°C in vacuum.
Yield 64 g
To remove last traces of water the product was heated in argon at 800°C for 3 hours.
Yield 50 g pure "aqueous" cadmium selenide.

EXAMPLE 6

Production of zinc selenide from zinc thiocyanate and selenourea experiment in DMF by the method generally described in Example 1 resulted in a product virtually identical to that of Example 1 except that the zinc selenide will be particularly free of oxygen as there is none in the zinc thiocyanate.

I claim

1. A process for the production of a metallic selenide selected from the group consisting of zinc selenide, cadmium selenide and mixtures thereof which comprises dissolving a compound of at least one of said metals and a non-gaseous selenium compound in dimethylformamide, said selenium compound being one which is decomposible in the dimethylformamide upon heating to yield selenium ions, and heating said solution to cause said selenium compound to decompose whereby the selenide ions and metal ions react and the resulting metallic selenide is homogeneously precipitated from solution.

2. A process as claimed in claim 1 in which the compound of the metal is zinc acetate or cadmium acetate.

3. A process as claimed in claim 1 in which the compound of the metal is a salt.

4. A process as claimed in claim 3 in which the salt is a salt of an organic acid.

5. A process as claimed in claim 1 in which the compound of selenium is selenourea or a substituted selenourea or a derivative of said urea or substituted urea in which the two nitrogen atoms of the urea molecule form part of a ring system.

6. A process as claimed in claim 1 in which the selenide is obtained as a complex with dimethylformamide and the dimethylformamide is removed from this complex to provide said metallic selenide.

7. A process as claimed in claim 1 in which the precipitation takes place also in the presence of thiourea.

8. A process as claimed in claim 1 in which the compound of selenium is selenourea and in which precipitation takes place in the presence of thiourea.

* * * * *